United States Patent
McKay-Smith et al.

(10) Patent No.: US 11,598,275 B2
(45) Date of Patent: Mar. 7, 2023

(54) METHOD OF CONTROLLING AN INTERNAL COMBUSTION ENGINE WITH A TURBOCHARGER

(71) Applicant: Perkins Engines Company Limited, Peterborough (GB)

(72) Inventors: Thomas M. McKay-Smith, Peterborough (GB); Stuart P. Smith, Peterborough (GB); William J. Hay, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 17/429,431

(22) PCT Filed: Feb. 6, 2020

(86) PCT No.: PCT/EP2020/025053
§ 371 (c)(1),
(2) Date: Aug. 9, 2021

(87) PCT Pub. No.: WO2020/160846
PCT Pub. Date: Aug. 13, 2020

(65) Prior Publication Data
US 2022/0112850 A1   Apr. 14, 2022

(30) Foreign Application Priority Data
Feb. 8, 2019 (GB) .................. 1901779

(51) Int. Cl.
*F02D 41/00* (2006.01)
*F02B 37/18* (2006.01)
(Continued)

(52) U.S. Cl.
CPC ........ *F02D 41/0007* (2013.01); *F02B 37/183* (2013.01); *F02D 41/1401* (2013.01);
(Continued)

(58) Field of Classification Search
CPC ............. F02D 41/0007; F02D 41/1401; F02D 41/1454; F02D 41/2422; F02D 2041/1409;
(Continued)

(56) References Cited

U.S. PATENT DOCUMENTS 4,702,218 A * 10/1987 Yoshioka ................ F02B 33/42
60/605.2
5,771,867 A    6/1998 Amstutz
(Continued)

FOREIGN PATENT DOCUMENTS

WO    8808486 A1    11/1988

OTHER PUBLICATIONS

Great Britain Search Report related to GB Application No. 1901779. 7; reported on Aug. 6, 2019.
(Continued)

*Primary Examiner* — Audrey B. Walter
*Assistant Examiner* — Dapinder Singh

(57) ABSTRACT

An engine assembly comprising an internal combustion engine having a combustion chamber; an intake manifold for supplying air to the combustion chamber; a fuel injector for supplying fuel to the combustion chamber; an exhaust manifold for receiving exhaust gas released from the combustion chamber and a rotatable drive shaft, wherein combustion of fuel in air within the combustion chamber results in rotation of the drive shaft. The engine assembly further comprises a turbocharger system comprising a turbine and a compressor, wherein the turbine is configured to receive exhaust gas from the exhaust manifold, to recover energy from the exhaust gas, and to release the exhaust gas via a turbine outlet; and wherein the compressor is configured to receive energy from the turbine and thereby to compress air for use in combustion of fuel in the combustion chamber. An
(Continued)

intake throttle valve is configured to selectively control a boost pressure by controlling supply of air to the intake manifold; and a bypass valve is configured to selectively divert exhaust gas from the exhaust manifold away from the turbine, wherein the bypass valve is controlled by the boost pressure. A controller is configured (a) to provide an intermediate value for desired valve position of the intake throttle valve based on a desired oxygen to fuel ratio; and (b) to output a final value for desired valve position of the intake throttle valve based on the intermediate value for desired valve position and an engine speed value.

15 Claims, 3 Drawing Sheets

(51) Int. Cl.
    *F02D 41/14*     (2006.01)
    *F02D 41/24*     (2006.01)

(52) U.S. Cl.
    CPC ..... *F02D 41/1454* (2013.01); *F02D 41/2422* (2013.01); *F02D 2041/1409* (2013.01); *F02D 2041/1429* (2013.01); *F02D 2200/101* (2013.01)

(58) Field of Classification Search
    CPC ....... F02D 2041/1429; F02D 2200/101; F02B 37/183
    See application file for complete search history.

(56) References Cited

U.S. PATENT DOCUMENTS

| | | |
|---|---|---|
| 6,279,551 B1 | 8/2001 | Iwano |
| 6,672,060 B1 | 1/2004 | Buckland |
| 7,082,924 B1 | 8/2006 | Ruedin |
| 8,661,814 B2 | 3/2014 | Ulrey |
| 8,769,949 B2 | 7/2014 | VanDuyne |
| 2006/0017485 A1 | 8/2006 | Ruedin |
| 2006/0174855 A1* | 8/2006 | Ruedin ............... F02D 41/1401 123/352 |
| 2007/0209363 A1* | 9/2007 | McEwen ................ F15B 15/10 60/602 |
| 2007/0027752 A1 | 12/2007 | Maim |
| 2007/0277526 A1* | 12/2007 | Malm ................... F02B 37/186 60/602 |
| 2011/0009999 A1 | 5/2011 | Singh |
| 2011/0099997 A1 | 5/2011 | Singh |
| 2012/0017311 A1 | 1/2012 | Yates et al. |
| 2012/0173118 A1 | 7/2012 | Wang |
| 2015/0030028 A1 | 10/2015 | Sivasubramanian |
| 2015/0300281 A1 | 10/2015 | Sivasubramanian |

OTHER PUBLICATIONS

International Search Report for related to International Application No. PCT/EP2020/025053; reported on May 19, 2020.

* cited by examiner

METHOD OF CONTROLLING AN INTERNAL COMBUSTION ENGINE WITH A TURBOCHARGER

This patent application is a 35 USC § 371 U.S. national stage of International Application No. PCT/EP2020/025053 filed on Februaruy 6, 2020, which claims the benefit and priority of Great Britain Patent Application No. 1901779.7 filed on Feb. 8, 2019, the disclosures of which are incorporated in their entirety by reference herein.

TECHNICAL FIELD

The disclosure relates to the field of internal combustion engines used in conjunction with a turbocharger and, in particular, to controlling operation of the same.

BACKGROUND

Effective operation of an internal combustion engine relies upon achieving an appropriate ratio of oxygen to fuel in the combustion chamber. Where the ratio is too high or too low, this results in sub-optimal attribute balance which leads to reduced power efficiency and a potential requirement for more processing of exhaust gases.

One method for controlling intake manifold pressure is to include within the engine hardware architecture a turbocharger with a bypass circuit including an electronically controllable bypass valve (also known as a wastegate). In this way, a primary route for exhaust gas leaving the combustion chamber takes exhaust gas into a turbine of a turbocharger, while a secondary route selectively facilitates bypass of exhaust gas away from the turbine using the electronically controllable bypass valve. The selective control of the bypass valve may be used to indirectly influence intake manifold pressure which, in turn, may be used to control air to fuel ratio in the combustion chamber.

Complex engine control processor hardware may be used to provide continuously precise instructions for positioning an actuator of the bypass valve, as well as to control all other actuators that control other variables associated with engine performance.

There may be circumstances where electronically controllable bypass valve functionality is unavailable or inappropriate but there may remain a desire to influence oxygen to fuel ratio using a turbocharger bypass circuit. It may also be the case in such circumstances that complex engine control processor hardware is unavailable or inappropriate.

In the absence of an electronically controllable bypass valve, it may still be appropriate to control intake manifold pressure. This may be achieved using a pneumatically regulated bypass valve but this approach has limitations dictated by specific engine operating conditions and valve characteristics.

SUMMARY OF THE DISCLOSURE

Against this background there is provided: an engine assembly comprising:
an internal combustion engine having: a combustion chamber; an intake manifold for supplying air to the combustion chamber; a fuel injector for supplying fuel to the combustion chamber; an exhaust manifold for receiving exhaust gas released from the combustion chamber and a rotatable drive shaft, wherein combustion of fuel in air within the combustion chamber results in rotation of the drive shaft;
a turbocharger system comprising a turbine and a compressor,
wherein the turbine is configured to receive exhaust gas from the exhaust manifold, to recover energy from the exhaust gas, and to release the exhaust gas via a turbine outlet; and
wherein the compressor is configured to receive energy from the turbine and thereby to compress air for use in combustion of fuel in the combustion chamber;
an intake throttle valve configured to selectively control a boost pressure by controlling supply of air to the intake manifold;
a bypass valve configured to selectively divert exhaust gas from the exhaust manifold away from the turbine, wherein the bypass valve is controlled by the boost pressure; and
a controller configured:
(a) to provide an intermediate value for desired valve position of the intake throttle valve based on a desired oxygen to fuel ratio and; and
(b) to output a final value for desired valve position of the intake throttle valve based on the intermediate value for desired valve position and an engine speed value.

In this way it is still possible to further influence the intake manifold pressure by controlling the intake throttle valve position in situations where the bypass valve otherwise has limited or no ability to selectively divert exhaust gas from the exhaust manifold away from the turbine.

Moreover, it is possible to do this using a two-stage control process wherein the first stage may be implemented using conventional proportional integral control strategy and the second stage may be implemented using a linearization map such as in the form of a look-up table.

BRIEF DESCRIPTION OF THE DRAWINGS

Embodiments will now be described with reference to the following Figures in which.

DETAILED DESCRIPTION

Figure 1:
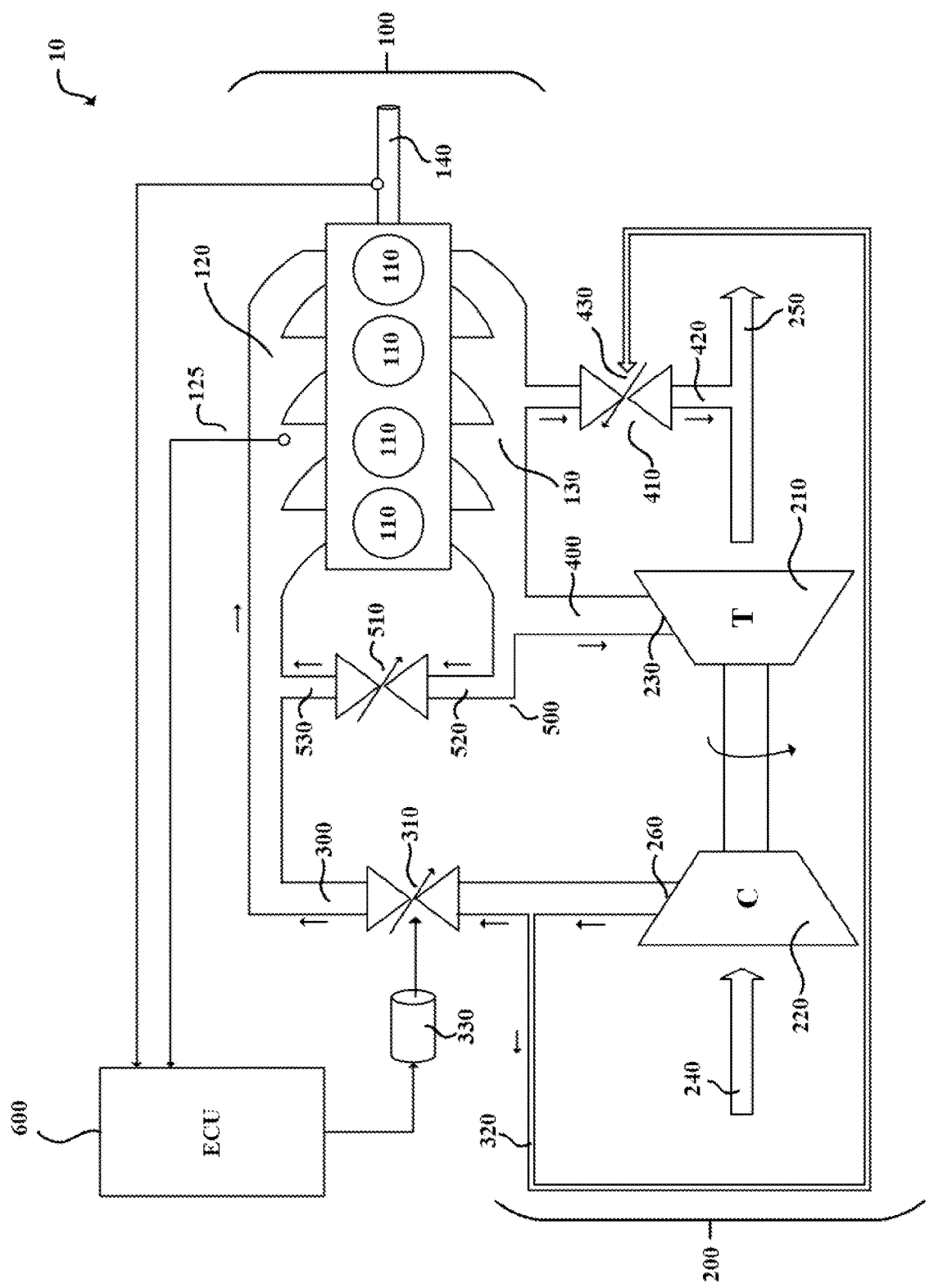
FIG. 1 shows a schematic representation of an engine assembly in accordance with the disclosure.
Figure 2:
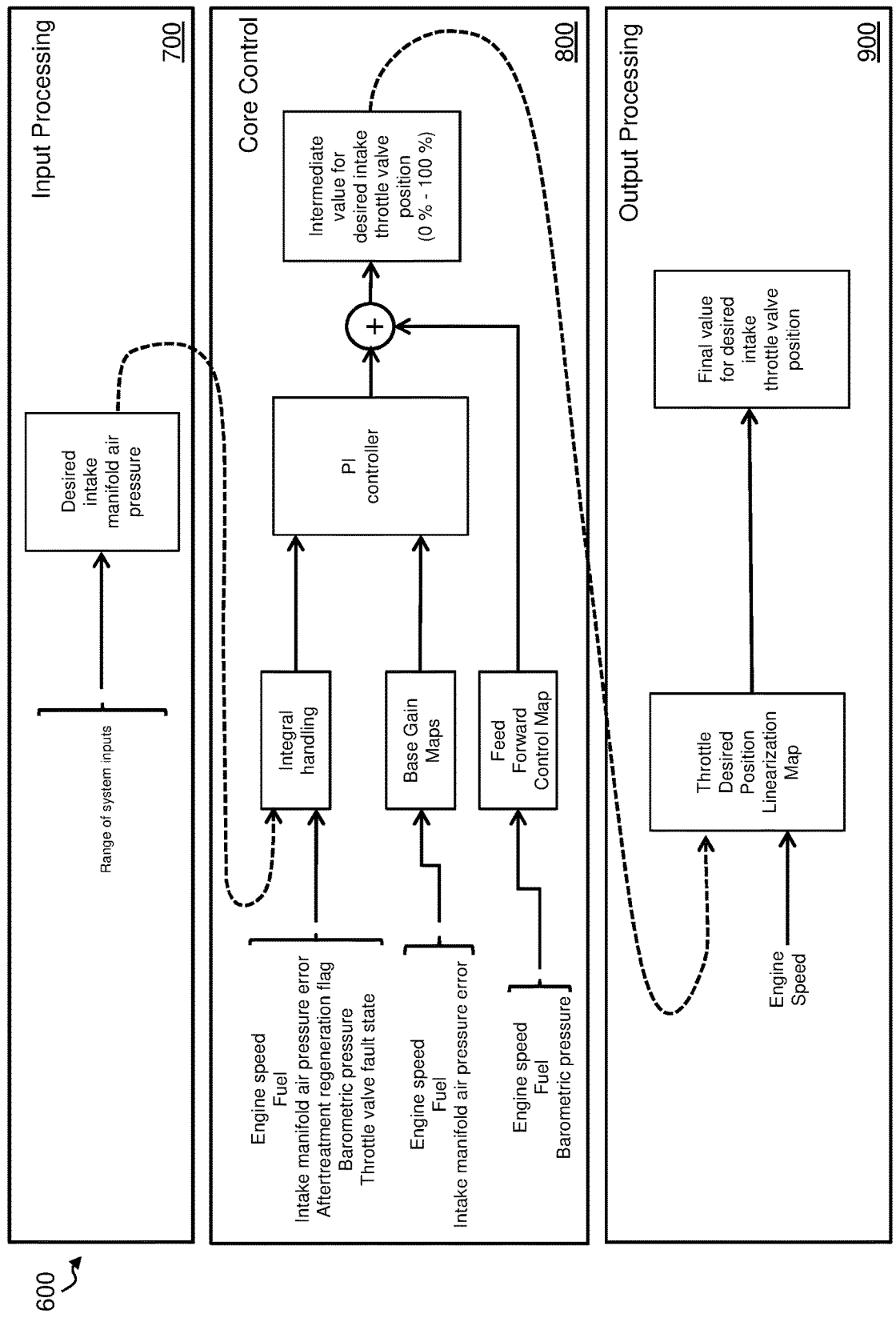
FIG. 2 shows a schematic representation of control functionality that may be employed in accordance with the disclosure for controlling the engine assembly.

Referring to FIG. 1, an engine assembly 10 may comprise an internal combustion engine 100, a turbocharger system 200, an air inlet circuit 300, an air outlet circuit 400, an exhaust gas recirculation (EGR) circuit 500 and a controller 600.

The internal combustion engine 100 may comprise a combustion chamber 110, an intake manifold 120 for supplying air to the combustion chamber 110, a fuel injector (not shown) for supplying fuel to the combustion chamber 110, an exhaust manifold 130 for receiving exhaust gas released from the combustion chamber 110 and a rotatable drive shaft 140.

The intake manifold 120 may comprise an intake manifold air pressure sensor 125.

The combustion chamber 110 may comprise one or more combustion cylinders 110. Each combustion cylinder 110 of the one or more combustion cylinders 110 may comprise a fuel injector (not shown).

As in a conventional internal combustion engine 100, combustion of fuel in air within the one or more combustion chamber 110 results in rotation of the drive shaft 140.

The turbocharger system 200 may comprise a turbine 210 and a compressor 220. The turbine 210 may be configured to receive exhaust gas from the exhaust manifold 130 via a turbine inlet 230, to recover energy from said exhaust gas, and to release said exhaust gas via a turbine outlet 250. The compressor 220 may be configured to receive energy from the turbine 210 and thereby to compress air for use in combustion of fuel in the combustion chamber 110. The compressor 220 may comprise a compressor inlet 240 for receiving air at ambient pressure for compression within the compressor 220 and a compressor outlet 260.

The engine assembly 10 may further comprise an air inlet circuit 300 for transferring air between the compressor outlet 260 and the intake manifold 120. The engine assembly 10 may further comprise an air outlet circuit 400 for transferring exhaust gas between the exhaust manifold 130 and the turbine inlet 230.

The air inlet circuit 300 may comprise an intake throttle valve 310 for controlling air flow and air pressure in the air inlet circuit 300. The intake throttle valve 310 may be adjusted in order to selectively control a boost pressure at the intake manifold 120.

The air outlet circuit 400 may comprise a bypass valve 410 capable of selectively diverting exhaust gas from the exhaust manifold 130 away from the turbine 210. In the arrangement shown in FIG. 1, the bypass valve 410 is located in a bypass loop 420 that provides a connection between the exhaust manifold 130 and the turbine outlet 230 without going via the turbine 210.

Downstream of the turbine outlet 230 there may be an exhaust aftertreatment system (not shown) configured to receive all exhaust gas from the exhaust manifold 130 (whether via the turbine 210 or via the bypass loop 420) for processing prior to release.

The bypass valve 410 may be a spring-biased, pneumatically controlled bypass valve 410. The pneumatically controlled bypass valve 410 may comprise a pneumatic actuator 430, wherein the pneumatically controlled bypass valve 410 is controlled by pressure at the pneumatic actuator 430. The pressure at the pneumatic actuator 430 may need to exceed a pressure threshold in order for the spring-bias to be overcome such that the bypass valve 410 begins to open. A relationship between pressure and valve actuator may be non-linear and may be dependent upon engine speed.

An actuator channel 320 may be provided between the air inlet circuit 300 and the pneumatic actuator 430. In the arrangement of FIG. 1, the actuator channel 320 meets the air inlet circuit 300 between the compressor outlet 260 and the intake throttle valve 310.

The intake throttle valve 310 may be controlled via an intake throttle valve actuator comprising a DC motor 330.

Optionally, the engine assembly 10 may comprise an exhaust gas recirculation (EGR) circuit 500. The EGR circuit 500 comprises an EGR valve 510, an exhaust side conduit 520 configured to supply exhaust gas between the exhaust gas manifold 130 and a first side of the EGR valve 510, and an intake side conduit 530 configured to supply gas between a second side of the EGR valve 510 and the intake manifold 120. In this way, by opening the EGR valve 510, exhaust gas may be recirculated from the exhaust gas manifold 130 to the intake manifold 120 in order to go through a further combustion cycle in the combustion chamber 110. Accordingly, exhaust gas recirculation may influence air to fuel ratio in the combustion chamber 110.

The controller 600 is configured:
(a) to provide an intermediate value for desired valve position of the intake throttle valve based on a desired oxygen to fuel ratio; and
(b) to output a final value for desired valve position of the intake throttle valve based on the intermediate value for desired valve position and an engine speed value.

The intermediate value for desired valve position may simply be an indication of an extent to which the valve should be open on an arbitrary scale of, say, 0 to 1, 0 to 10 or 0 to 100. This figure may not actually represent an actual valve position but may simply represent a numerical intermediate controller effort output.

The controller may comprise an input processing segment 700, a core control segment 800 and an output processing segment 900.

The input processing segment 700 may provide signal filtering and limiting of the desired intake manifold air pressure set point and optional additional pre-filtering of the boost pressure value from the intake manifold air pressure sensor 125.

A signal provided from the intake manifold air pressure sensor 125 may be filtered in input processing segment 700 or elsewhere.

A directional filter may be employed as part of the input processing segment 700 in order to help reduce controller instability due to high frequency set point changes. This may allow different filter factors to be applied depending on whether the boost set point is increasing or decreasing. A hysteresis may be applied to prevent filter factor toggling. Filters may be tuned to ensure that the controller responds correctly to a transient event but is not chasing any rapid increase or decrease in set point that is beyond the capabilities of the hardware (e.g. the turbocharger).

The final value for the actual desired intake manifold air pressure may be subject to minimum and maximum limits.

The maximum may be mapped as a function of engine speed and may be calibrated such that the set point cannot request a final value for desired intake throttle valve position that would result in an intake manifold air pressure that is above the peak-cylinder pressure calibration target.

The minimum may be set to align to barometric pressure plus a tuneable offset. This may be calibrated to ensure that the set point cannot request a final value for desired intake throttle valve position that would be fall within an unacceptable range, for example to prevent excess throttling that could stall the engine.

A minimum limit may also be applied to the desired intake manifold pressure setpoint before it enters the controller by a turbocharger anti-surge limiting strategy.

Processing of sensor input data may use an interrupt based windowed average of sensor voltages using a First-In, First-Out (FIFO) approach. New samples may be obtained, for example, every 30 degrees of engine revolution. The aim of this may be to filter out the pulsed air flow phenomenon to reduce the amplitude of the pressure input to the controller and prevent instability.

The core control segment 800 may comprise a proportional integral (PI) controller. The PI controller may minimise boost pressure error.

An output of the core control segment 800 may comprise an intermediate value for desired intake throttle valve position expressed as a percentage.

Figure 3:
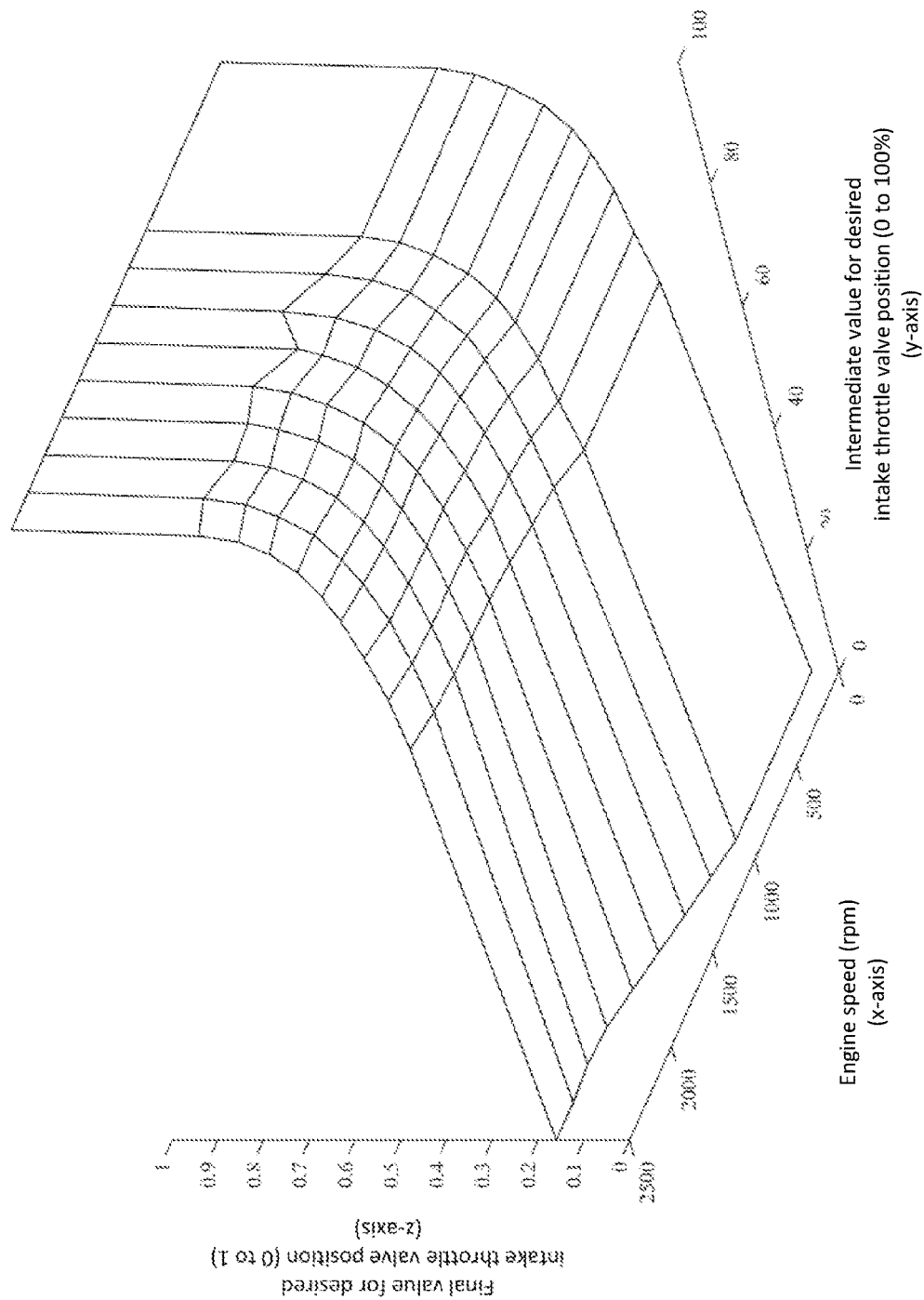
FIG. 3 shows a throttle position linearization map for use as part of the control functionality that may be employed in accordance with the disclosure.

The output processing segment 900 may receive the intermediate value for desired intake throttle valve position and pass it through a linearization map such as that shown in FIG. 3.

The output processing segment 900 may store the linearization map in the form of a look-up table. The look-up table may have two inputs and one output. In the example of FIG. 3, the two inputs are plotted on the x- and y-axes while the output is plotted on the z-axis.

The two inputs may be (a) the intermediate value for desired intake throttle valve position; and (b) engine speed. The output may comprise the final value for desired intake throttle valve position.

The final value for desired intake throttle valve position (determined as the value that corresponds with the current values for the two inputs) may be used to provide a desired position set point for an intake throttle position controller (not shown) by which a valve actuator is instructed to adjust.

INDUSTRIAL APPLICABILITY

Smaller engines with lower specification control hardware may benefit from a pneumatically controlled bypass valve configured to selectively divert exhaust gas from the exhaust manifold away from the turbine, wherein the bypass valve is controlled by the boost pressure. Furthermore, smaller engines with lower specification control hardware may benefit from utilisation of an electronically controllable intake throttle valve (pre-existing for aftertreatment thermal management) for a secondary purpose of improved intake manifold pressure control. Usage of both the pneumatically controlled bypass valve and the electronically controllable intake throttle valve for the purpose of intake manifold pressure control may allow for improved engine performance compared to using a pneumatically controlled bypass valve in the absence of an electronically controllable intake throttle valve. Such engines may benefit from the use of conventional PI controller functionality in order to achieve control of intake manifold pressure.

The invention claimed is:

1. An engine assembly comprising:
    an internal combustion engine having: a combustion chamber; an intake manifold for supplying air to the combustion chamber; a fuel injector for supplying fuel to the combustion chamber; an exhaust manifold for receiving exhaust gas released from the combustion chamber and a rotatable drive shaft, wherein combustion of fuel in air within the combustion chamber results in rotation of the drive shaft;
    a turbocharger system comprising a turbine and a compressor,
        wherein the turbine is configured to receive exhaust gas from the exhaust manifold via a turbine inlet, to recover energy from the exhaust gas, and to release the exhaust gas via a turbine outlet; and
        wherein the compressor is configured to receive energy from the turbine and thereby to compress air received via a compressor inlet and output compressed air to the air intake manifold via a compressor outlet for use in combustion of fuel in the combustion chamber;
    an intake throttle valve fluidly connecting the compressor outlet to the intake manifold and configured to selectively control a boost pressure by controlling supply of air to the intake manifold;
    a bypass valve fluidly connecting the exhaust manifold to the turbine outlet and configured to selectively divert exhaust gas from the exhaust manifold away from the turbine, wherein the bypass valve is controlled by the boost pressure; and
    a controller configured:
        (a) to provide an intermediate value for desired valve position of the intake throttle valve based on a desired oxygen to fuel ratio; and
        (b) to output a final value for desired valve position of the intake throttle valve based on the intermediate value for desired valve position and an engine speed value.

2. The engine assembly of claim 1 wherein the intermediate value for desired valve position of the intake throttle valve is based on a pressure set point that is derived from the desired oxygen to fuel ratio.

3. The engine assembly of claim 1 wherein the intermediate value for desired valve position of the intake throttle valve is a function of one or more of the following variables:
    estimated or measured carbon dioxide to oxygen ratio;
    estimated or measured airflow through the engine;
    fuel injection volume;
    atmospheric pressure.

4. The engine assembly of claim 1 further comprising an exhaust gas recirculation circuit providing fluid communication between the exhaust manifold and the intake manifold, the exhaust gas recirculation circuit comprising an exhaust gas recirculation valve that facilitates control of flow of exhaust gas between the exhaust manifold and the intake manifold.

5. The engine assembly of claim 4 wherein the intermediate value for desired valve position of the intake throttle valve is a function of one or more of the following variables:
    exhaust gas recirculation valve position;
    estimated or measured exhaust gas flow rate;
    temperature of exhaust gas;
    pressure of exhaust gas.

6. The engine assembly of claim 1 wherein the controller comprises a proportional integral (PI) controller configured to provide the intermediate value for desired valve position of the intake throttle valve based on the desired oxygen to fuel ratio.

7. The engine assembly of claim 1 wherein the controller comprises a proportional integral derivative (PID) controller configured to provide the intermediate value for desired valve position of the intake throttle valve based on the desired oxygen to fuel ratio.

8. The engine assembly of claim 1 wherein the intermediate value is expressed as one of:
    a percentage between 0% and 100%;
    a fraction between 0 and 1; and
    a decimal between 0 and 1.

9. The engine assembly of claim 1 wherein the final value for desired valve position of the intake throttle valve is derived from a look up table having as inputs:
    (a) intermediate value for desired valve position of the intake throttle valve; and
    (b) engine speed value.

10. The engine assembly of claim 1 wherein a valve actuator controller of the intake throttle valve uses the final value for desired valve position of the intake throttle valve to determine a control signal for moving an actuator of the intake throttle valve into the desired valve position.

11. The engine assembly of claim 1:
    wherein the bypass valve is a pneumatic valve comprising a biasing element configured to act to close the valve; and
    wherein the boost pressure may act against the biasing element to open the bypass valve.

12. A method of controlling an engine assembly, the engine assembly comprising:

an internal combustion engine having: a combustion chamber; an intake manifold for supplying air to the combustion chamber; a fuel injector for supplying fuel to the combustion chamber; an exhaust manifold for receiving exhaust gas released from the combustion chamber and a rotatable drive shaft, wherein combustion of fuel in air within the combustion chamber results in rotation of the drive shaft;

a turbocharger system comprising a turbine and a compressor,
wherein the turbine is configured to receive exhaust gas from the exhaust manifold via a turbine inlet, to recover energy from the exhaust gas, and to release the exhaust gas via a turbine outlet; and
wherein the compressor is configured to receive energy from the turbine and thereby to compress air received via a compressor inlet and output compressed air to the air intake manifold via a compressor outlet for use in combustion of fuel in the combustion chamber;

an intake throttle valve fluidly connecting the compressor outlet to the intake manifold and configured to selectively control a boost pressure by controlling supply of air to the intake manifold;

a bypass valve fluidly connecting the exhaust manifold to the turbine outlet and configured to selectively divert exhaust gas from the exhaust manifold away from the turbine, wherein the bypass valve is controlled by the boost pressure; and wherein the method comprises:
providing an intermediate value for desired valve position of the intake throttle valve based on a desired oxygen to fuel ratio; and
outputting a final value for desired valve position of the intake throttle valve based on the intermediate value for desired valve position and an engine speed value.

13. The method of claim 12 wherein the step of providing an intermediate value for desired valve position of the intake throttle valve based on a desired oxygen to fuel ratio involves use of a proportional integral (PI) controller.

14. The method of claim 12 wherein the step of outputting a final value for desired valve position of the intake throttle valve based on the intermediate value for desired valve position and an engine speed value involves use of a linearization map.

15. The method of claim 14 wherein the linearization map is defined by a look-up table.

\* \* \* \* \*